United States Patent [19]

Hess et al.

[11] Patent Number: 4,479,043
[45] Date of Patent: Oct. 23, 1984

[54] CONTROLLING THE ZONE OF LONGITUDINALLY SEAM-WELDING SPLIT TUBES

[75] Inventors: Walter Hess; Franz Nicolai, both of Mülheim; Erich Treiss, Duisburg; Otto Götting, Mülheim, all of Fed. Rep. of Germany

[73] Assignee: Mannesmann AG, Duesseldorf, Fed. Rep. of Germany

[21] Appl. No.: 369,819

[22] Filed: Apr. 19, 1982

[30] Foreign Application Priority Data

Apr. 21, 1981 [DE]  Fed. Rep. of Germany ....... 3116364

[51] Int. Cl.$^3$ .............................................: H05B 6/06
[52] U.S. Cl. .................. 219/8.5; 219/10.41; 219/9.5; 219/60.2; 219/61; 219/105
[58] Field of Search ................. 219/7.5, 9.5, 8.5, 60.2, 219/61, 61.11, 61.3, 10.41, 105, 62

[56] References Cited

U.S. PATENT DOCUMENTS

| 1,857,505 | 5/1932 | Heineman | 219/105 |
| 2,021,157 | 11/1935 | Stahl | 219/105 |
| 3,504,149 | 3/1970 | Dixon et al. | 219/9.5 |
| 4,181,845 | 1/1980 | Bolton | 219/8.5 |

FOREIGN PATENT DOCUMENTS 512017  6/1976  U.S.S.R. ............................ 219/105

Primary Examiner—Roy N. Envall, Jr.
Assistant Examiner—M. M. Lateef
Attorney, Agent, or Firm—Ralf H. Siegemund

[57] ABSTRACT

The h.f.-heated edges of a split tube are prepared prior to heating by means of contour-rolling the edges in order to obtain a convex contour in which the temperature is isothermically distributed, parallel to the convex edges.

1 Claim, 8 Drawing Figures

CONTROLLING THE ZONE OF LONGITUDINALLY SEAM-WELDING SPLIT TUBES

BACKGROUND OF THE INVENTION

The present invention relates to controlling or varing the welding during high frequency, longitudinal seam welding of tubes and pipes.

The art of the tube and pipe making includes, as a particular process step, the longitudinal seam welding of adjoining or abutting edges of a suitably bent skelp. As a preparatory step it is known to trim the edges and to shape them in a cutting stage so that the edge corners have right angles to the adjoining flat surface portion of the skelp; accordingly, the abutting and adjoining edges of the folded skelp to be welded together, meet at least most plain parallelly to each other. Consequently, a heat transfer barrier is locally set up, and due to the physics underlying the flow and distribution of the electric welding current in the skelp edge zone an excessive amount of heating occurs in the inner and outer corner portions of the edges. They will therefore, fuse slightly earlier than more central edge zone and unfortunately impede a complete removal of the oxide from these more central edge zone portions.

DESCRIPTION OF THE INVENTION

It is an object of the present invention to provide a new and improved method for welding the edges of skelp or strip which has been folded into a split-tube the improvement relating particularly to the avoiding of excessively heating the corners of the skelp edges so that the removable of oxide from the welding zone is improved.

In accordance with the preferred embodiment of the present invention, it is suggested to convexly shape the skelp edges immediately before the welding and also prior to heating the edges for purposes of welding so that a more uniform temperature distribution is obtained across the entire surface, which is composed of the two edge-surfaces as abutting during the welding and the welding of the edge zone begins in the middle and progresses in an outward direction as to the edge surface. This particular method will improve greatly the quality of the weld and is particularly applicable in the art of tube making using skelp and strip material that is quite thick and is preferably made of a high strength steel. Moreover, it is suggested to provide two contour rolls up-stream from the welding zone to obtain the convex edge zone contour. These rolls are provided up-stream from the heating zone for the edges as required by the invention concept. Down-stream from the latter the temperature of the edges is measured and uniformity is obtained by modifying the relative attitude of one or both of the contour rollers vis-à-vis the respective edge so that in fact a uniform heating is obtained throughout the entire weld.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

DETAILED DESCRIPTION OF THE DRAWINGS

Figure 3A:
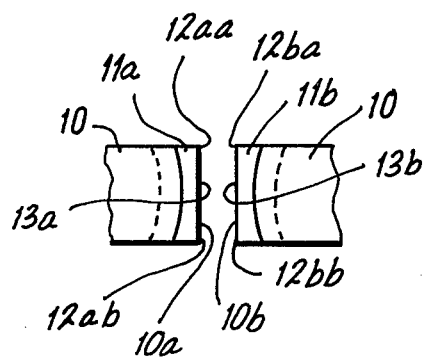
FIG. 3 is a group of three figures identified by a, b, and c for a schematic illustration and demonstration of the prior art practice and its problems.

Reference is first made to the group of figures under a designation FIG. 3. This group of figures explains the problems of the prior art method and is used to explain further, as a jump-of point in the explanation, how the problems are overcome. Reference No. 10 refers here to the piece of skelp having straight edges 10a and 10b originally being the small sides of the skelp that face away from each other. Pursuant to bending these faces are now approaching each other for purposes of being welded together. The high frequency method of heating the edges results in melting zones 11a and 11b which show a deeper penetration of the heating current near the corner portions so that a larger portion is being heated and at a greater depth than in more central portions of the skelp. The dashed lines are isotherms demonstrating that the corners such as 12aa, 12ab, 12ba and 12bb are hotter than central zones 13a and 13b of the skelp edges.

Figure 3B:
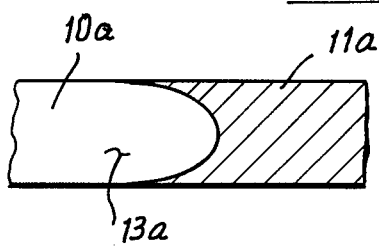

The zone 11a in FIG. 3b shows that the particular melting zones cause that melting to advance further near the corners than in middle areas 13a, assuming that welding progressed from the right to the left and the melted portion 11a is advanced toward the left in the figure. This is the reason for an incomplete removal of oxide from that central portion, the oxide does not have any way to go and is trapped in between the adjoining skelp edge which fuse earlier in the forwardly extending, melted corner zones.

Figure 3C:
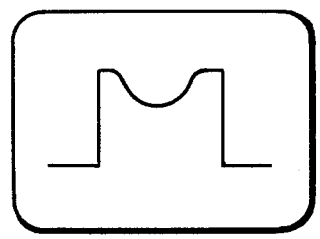

FIG. 3c is an oscillographic picture of the distribution of the electric current across the edges and taken along Line c—c in FIG. 3b. The graph shows that the corner zones of the skelp edges receive preferred quantities of electric current; a reduction is observed in the more central portion thereof.

Figure 1:
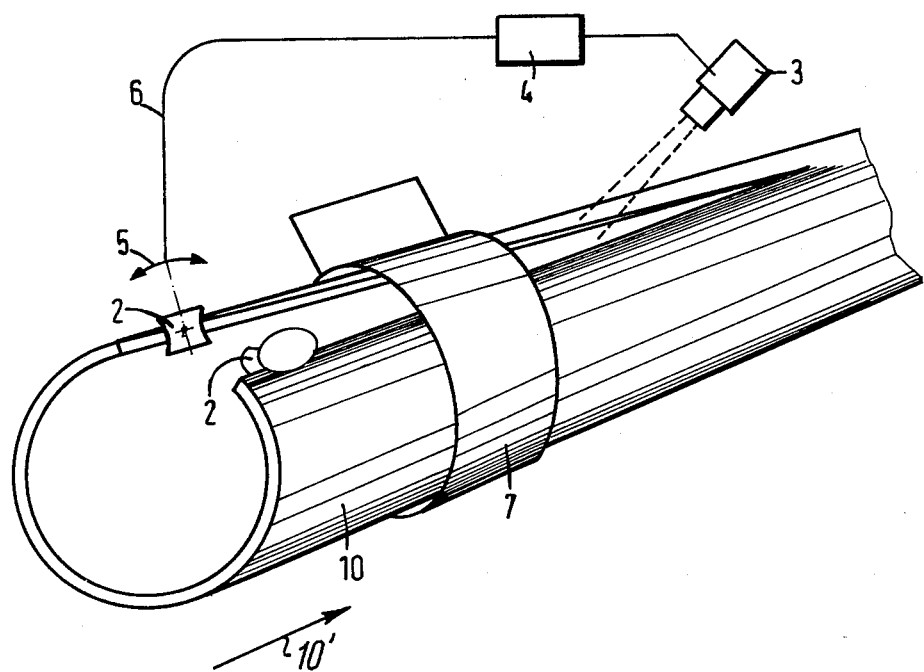
FIG. 1 illustrates somewhat schematically and in perspective view equipment for practicing the preferred embodiment of the present invention in accordance with the best mode thereof.
Figure 2:
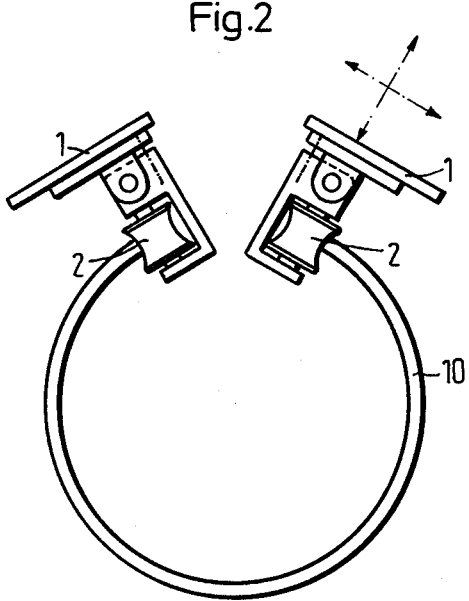
FIG. 2 illustrates a cross section of the device and particularly of the skelp shown in FIG. 1.
Figure 4A:
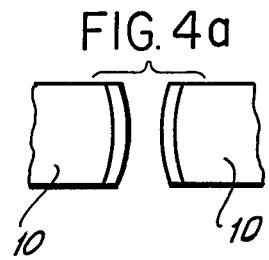
FIG. 4 is analogous a group of three figures identified by a, b, and c and illustrating how the inventive method affects and modified the previous, undesirable conditions.

Turning now to FIG. 1, there is illustrated equipment in perspective view as well as in cross section of a skelp or strip 10 being folded or bent longitudinally into a split tube so that its adjoining edges can be longitudinally seam welded. Reference No. 1 refers to two roll holders and roll journalling devices respectively supporting two concavely contoured rolls 2. These rolls are passive in nature i.e. they do not have to be driven. The set of arrows indicates that the respective frame and holder 1, can be position-adjusted for obtaining the proper operating position in respect to the other one and to the bent skelp passing through. The two rolls and their respective holders are arranged up-stream from the welding zone, the skelp 10 progressing in the direction of the arrow 10' through the welding station 7 referring particularly to an electrode by means of which high frequency energy is applied to the tube to be made, and that energy will be effective primarily in the edge zones. The two rolls 2 are disposed specifically upstream from this high frequency welding zone. In other words, the two rolls engage or are positioned to engage the not yet adjoining edges of skelp 10 up-stream from the heating and fusion. These two rolls impart upon the edges a convex contour as shown in FIG. 4a.

A temperature sensor 3 is disposed down-stream from the rolls 2 and from the point of heating but up-stream from welding and fusion. The device 3 measures the temperature of both edges of the skelp i.e. it measures all those edge portions which will become the welding zone. Specifically, instrument 3 ascertains whether or not the two edges are equally hot. Also, one may detect separately whether there is a temperature difference across one or each of the edges. The temperature measuring device 3 is electrically connected to an electric circuit 4 which in turn operates an adjusting device 5 illustrated merely schematically and by a double arrow to indicate the resulting control action transmitted from the circuit 4 upon the device 5 by means of a connection 6. There may be an analogous adjusting device for the other roll holder which is needed if the temperature across each of these edges is adjusted separately.

Figure 4B:
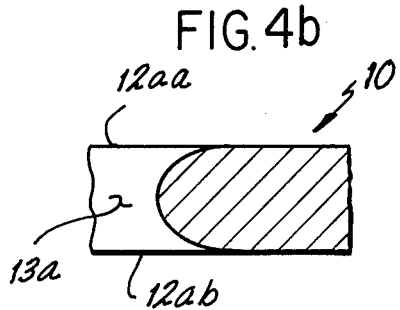
Figure 4C:
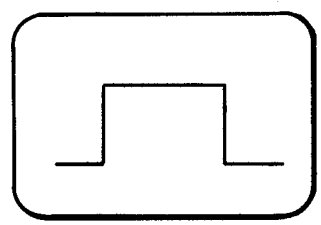

It should be noted further, that an edge cutting and trimming station is still disposed more up-stream from the arrangement as shown, which is to the left front of the drawing of FIG. 1. The rolls 2 modify the straight edges as provided by and in this cutter station in order to obtain a convex contour as shown in FIG. 4a. This way one obtains as a result of the high frequency heating a temperature distribution in which isothermic line run in parallel to the convex contour of the edges which is also schematically in FIG. 4a. As a consequence, one obtains a zone of fusion the contour of which is shown in FIG. 4b. FIG. 4c illustrates an oscillographic display of the electric current distribution across an edge and one can see that through appropriately selecting the convexity of the edge a very even electric current distribution is obtainable.

The purpose of measuring the temperature of the about to be welded edges is to cause one of the rolls to be adjusted, or both of them, by tilting or otherwise shifting the angle of orientation of the respective roll vis-à-vis the edge it works so that the convexity (curvature) is changed to obtain, indeed, a uniform temperature distribution of the welding zone.

The invention is not limited to the embodiments described above; but all changes and modifications thereof, not constituting departures from the spirit and scope of the invention, are intended to be included.

We claim:

1. A method of controlling the welding zone pursuant to high-frequency-seam-welding the adjoining edges of a split tube, comprising the step of convexly shaping the edges of the not yet closed tube prior to welding as preparation for obtaining a more uniform temperature across the edges;

high frequency heating the edges as shaped progressively just prior to tube closing so that on account of the convexly shaped edges, fusion occurs first in central portions of the adjoining edges as the edges are forced together downstream from a location in which the edges abut first, which is followed by fusion of corner portions thereof;

measuring the temperature of the edges downstream from heating; and adjusting the shaping towards obtaining a variation in convexity to thereby modify the temperature distribution in the edges as heated.

* * * * *